Oct. 22, 1935.   H. G. KAMRATH   2,018,131
MULTISTAGE TYPE AIR CLEANER
Filed Nov. 30, 1928

Inventor
Herbert G. Kamrath
By Blackmore, Spencer & Hash
Attorneys

Patented Oct. 22, 1935

2,018,131

UNITED STATES PATENT OFFICE 2,018,131

MULTI-STAGE TYPE AIR CLEANER

Herbert G. Kamrath, Flint, Mich., assignor, by mesne assignments, to General Motors Corporation, Detroit, Mich., a corporation of Delaware Application November 30, 1928, Serial No. 322,848

4 Claims. (Cl. 183—15)

This invention relates to air cleaners of the multi-stage type.

As is well known, air cleaners of the dry or liquid wetted filter type are much more efficient than those of other types in removing foreign matter from the air to be cleaned. However, where the air to be cleaned contains excessive amounts of foreign matter, simple air cleaners of the filter type are not entirely satisfactory for the reason that, after a comparatively short period of use, they become clogged with foreign matter.

It is an object of this invention to provide an air cleaner which, while retaining all of the good features of air cleaners of the filter type, is not liable to become clogged when used where it is required to remove excessive amounts of foreign matter from the air to be cleaned.

This object of the invention is attained, in the preferred embodiment of my invention, by providing an air cleaner of the multi-stage type, which includes means to remove the greater part of the foreign matter from the air to be cleaned, and an air cleaning element of the filter type through which the partially cleaned air is then passed and which removes the residue of foreign matter therefrom.

Other objects of the invention will be apparent from a perusal of the following description of the preferred embodiment of my invention which is shown in the accompanying drawing. In the drawing.

Figure 1:
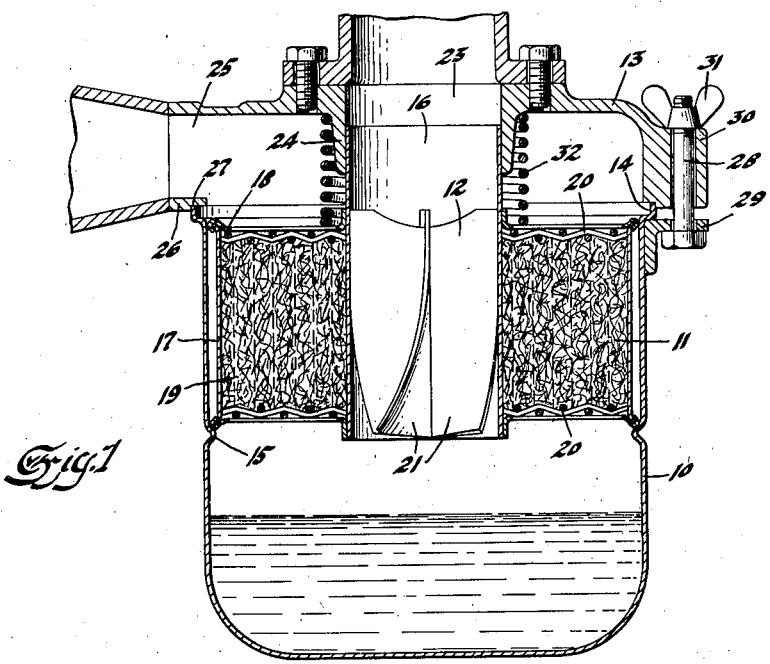
Figure 1 is a vertical section, taken on the line 1—1 of Figure 2, through an air cleaner of the multi-stage type.
Figure 2:
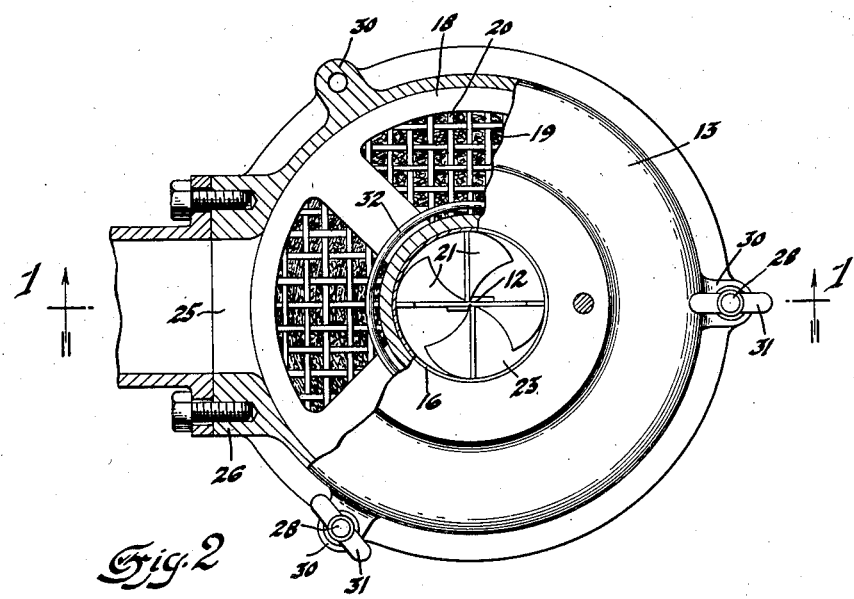
Figure 2 is a top plan view, with parts broken away and in section, of the air cleaner shown in Figure 1.

In its preferred embodiment, as shown in the drawing, my air cleaner includes a cup portion 10, a dust-collecting element 11, a vane element 12, and a cover portion 13.

The cup portion 10 is provided on its open end with an outwardly extending circumferential flange 14, and intermediate its open and closed ends with an inwardly extending circumferential rib 15.

The dust collecting element 11 includes a central tube 16, a cylindrical shell 17 coaxial with and surrounding one end of the central tube, and spiders 18 secured to opposite ends of the shell and to one end and an intermediate portion of the tube to secure the shell and tube together in spaced relation. The annular space between the central tube 16, the shell 17, and the spiders 18 is filled with a suitable oil-coated dust-collecting medium 19. The dust-collecting medium 19 preferably consists of a "cartridge" of fabric, woven or knitted from flat copper ribbon, of the type disclosed in my copending application S. N. 245,404, filed January 9, 1928 which has matured into Patent No. 1,829,401, dated October 27, 1931. To eliminate the tendency of the dust-collecting medium to work out of the shell through the spaces between the legs of the spiders, annular members 20 of wire screen are preferably provided.

The dust-collecting element 11 is made of such size as to fit snugly within the open end of the cup portion 10 with its lower end seated and supported on the rib 15 and with its upper end at substantially the level of flange 14. When the parts are thus assembled, as shown in the drawing, the upper end of the central tube 16 projects upwardly beyond the open end of the cup portion 10.

Within the central tube 16 is located the vane element 12 which consists of a plurality of helical vanes 21 suitably secured together so as to form, in effect, a single member. The edges of the vanes 21 are frictionally engaged with the wall of the tube so that the vane element 12 may be adjusted to and remain in any desired position in the tube.

The cover portion 13 consists of a generally cup-shaped member through the closed end of which extends an opening 23 surrounded by an inwardly projecting collar 24 and through the side wall of which extends an opening 25 surrounded by an outwardly projecting collar 26.

The cover portion 13 is assembled with the cup portion 10, the dust-collecting element 11, and the vane element 12, as shown in the drawing, with the flange 14 of the cup portion seated in a rabbet 27 in the side wall of the cover portion adjacent its open end, and with the upwardly projecting end of the central tube 16 snugly telescoped within the collar 24. The cover portion is secured to the cup portion by means of the bolts 28, which extend through brackets 29 secured to the cup portion adjacent its open end and through lugs 30 formed on the cover portion, and wing nuts 31 threaded on the bolts. To maintain the dust-collecting element 11 in position in the cup portion 10, there is provided a coiled spring 32 surrounding the collar 24 and the upper end of the central tube 16 and bearing at its upper and lower ends, respectively, against the cover portion and the dust-collecting element. The spring is preferably made of such diameter that it will fit snugly around the upper end of the collar 24 so that it will not be likely to be displaced therefrom and lost when the cleaner is dismantled.

The type of air cleaner hereinbefore described, although obviously susceptible of use in other installations, is peculiarly adapted for use in cleaning the air to be supplied to the carburetor of a tractor of the type which is provided with a vertical stack or air intake conduit extending from the air intake conduit of the carburetor to a point above the zone of dust raised by the tractor. When used in such an installation, the air cleaner is positioned between the air intake conduit of the carburetor and the stack, with the opening 25 in the cover communicating with the former and with the opening 23 in the cover with the latter.

When the air cleaner is in use, a supply of oil or other suitable liquid is maintained in the bottom of the cup portion 10. During the operation of the tractor, the suction produced in the engine cylinders draws air through the stack into the air cleaner through the opening 23 and, thence, into the central tube 16. During its passage through the central tube 16, the air impinges against the vanes 21 which cause it to travel in a helical path, and enter the lower part of the cup portion 10 with a whirling motion. The whirling motion of the air as it enters the lower part of the cup portion 10 causes a portion of the foreign matter carried thereby to be thrown by centrifugal action against the oil-coated side walls of the cup portion to which it adheres and is thus removed from the air. The downward velocity of the air causes it to impinge against the surface of the body of liquid within the lower part of the cup portion and the whirling motion thereof causes the impact to be distributed more or less evenly over a large part of the surface of the liquid. As the air impinges against the surface of the liquid, another portion of the foreign matter carried thereby is brought into contact with the liquid and adheres thereto and is thereby removed from the air. After impinging against the surface of the liquid, the air reverses its direction of flow, and, due to the fact that momentum of the particles of foreign matter carried by the air is greater than that of the air they are not able to reverse their direction of travel as quickly as the air and so some of them are carried by their momentum against the surface of the liquid to which they adhere and are thereby removed from the air. After reversing its direction of flow, the air, from which it will be obvious the greater proportion of the foreign matter has been removed, passes into the annular space between the central tube 16 and the cylindrical shell 17, through the interstices in the oil-coated dust-collecting medium 19, and into the space between the dust-collecting element and the closed end of the cover 13, whence it passes to the carburetor and engine cylinders. During its passage through the dust-collecting medium 19, any foreign matter, including any particles of oil which may be picked up by the air from the supply in the lower part of the cup portion 10, carried by the air are deposited on and retained by the oil-coated surface of the dust-collecting medium, with the result that the air passing into the carburetor and engine cylinders is free from foreign matter.

The vane element 12 may be adjusted, as previously mentioned, to any desired position in the central tube 16 in order to vary the force of the impact of the air on the surface of the liquid in the lower part of the cup portion 10, or, if for any reason it is felt desirable, may be dispensed with entirely. It is obvious, without explanation, that my air cleaner may be quickly and easily dismantled when this is necessary in order to clean it or to replace the liquid supply in the lower part of the cup portion 10 when it has become fouled with foreign matter or reduced to too small a volume by loss, and that, after any of these operations which may be necessary have been performed, it may just as easily be reassembled.

Although I have shown and described a preferred embodiment of my invention, it is to be understood that this has been done merely by way of example, and that the scope of my invention is limited only by the appended claims.

I claim:

1. In an air cleaner, an open-ended liquid receptacle, a cover for the open end of the receptacle, a dust-collecting element of the filter type positioned between the cover and the bottom of the receptacle, an air passage extending through the cover and through the dust-collecting element and communicating with the portion of the receptacle below the dust-collecting element, a vane element within the passage, and an air discharge opening in the cover.

2. In an air cleaner of the multi-stage type, an open-ended liquid receptacle, a conduit extending into the open end of the receptacle and from which air to be cleaned is adapted to be discharged onto the surface of the liquid, an annular open-ended dust collecting element through which the air is adapted to pass occupying the space between the walls of the conduit and the side walls of the receptacle and a vane element in the conduit arranged to cause the air emerging therefrom to impinge against an area of the surface of the liquid substantially greater than the cross sectional area of the conduit.

3. In an air cleaner which includes a cup-shaped body, a cover which closes the open end of the body and through which an air intake opening extends, and a unitary assembly, including a dust-collecting element and an air intake conduit which extends therethrough and communicates with the air intake opening in the cover; clamped between the body and the cover.

4. An air filter comprising a casing, filter material therein, a wall extending through the casing and forming an air inlet extending longitudinally of the casing, said casing containing a liquid in the bottom thereof, and air-centrifugating means in said air inlet.

HERBERT G. KAMRATH.